DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUG. 1, 1972

901 O.G. 8

T901,010

WATER-DISPERSIBLE ALPHA-ALUMINA MONOHYDRATE

George G. Hritz, Dennis Jack Royer, and William C. Ziegenhain, Ponca City, Okla., assignors to Continental Oil Company, Ponca City, Okla.

Filed July 21, 1971, Ser. No. 164,906

Int. Cl. C01f *7/36*

U.S. Cl. 423—626

No Drawing. 6 Pages Specification

A method for preparing water-dispersbile alpha-alumina monohydrate by water hydrolysis of aluminum alkoxide comprising:

(a) hydrolyzing said aluminum alkoxides, (b) extracting the organic products from the water-alumina portion of said hydrolysis, said water-alumina portion comprising from about 1 to 16 weight percent $Al_2O_3$, (c) adjusting the pH of the water-aluminum portion to about 0.5 to about 5.0 by the addition of acid and (d) spray drying the acidic alumina-water mixture.